(12) United States Patent
Liu et al.

(10) Patent No.: US 11,763,426 B2
(45) Date of Patent: Sep. 19, 2023

(54) MARINE SURVEY IMAGE ENHANCEMENT SYSTEM

(71) Applicants: Shiwei Liu, Lehi, UT (US); Zhe Yu, Holladay, UT (US)

(72) Inventors: Shiwei Liu, Lehi, UT (US); Zhe Yu, Holladay, UT (US)

( * ) Notice: Subject to any disclaimer, the term of this patent is extended or adjusted under 35 U.S.C. 154(b) by 105 days.

(21) Appl. No.: 17/193,522

(22) Filed: Mar. 5, 2021

(65) Prior Publication Data
US 2021/0342975 A1 Nov. 4, 2021

Related U.S. Application Data

(60) Provisional application No. 63/019,362, filed on May 3, 2020.

(51) Int. Cl.
*G06T 3/40* (2006.01)
*G06T 5/00* (2006.01)
*G06N 3/08* (2023.01)
*G06T 5/50* (2006.01)

(52) U.S. Cl.
CPC ............ *G06T 3/4053* (2013.01); *G06N 3/08* (2013.01); *G06T 3/4046* (2013.01); *G06T 5/002* (2013.01); *G06T 5/50* (2013.01); *G06T 2207/20081* (2013.01); *G06T 2207/20084* (2013.01); *G06T 2207/20221* (2013.01)

(58) Field of Classification Search
None
See application file for complete search history.

(56) References Cited

U.S. PATENT DOCUMENTS

| 8,670,630 | B1* | 3/2014 | Kwatra | G06T 3/4053 |
| | | | | 382/254 |
| 2021/0329892 | A1* | 10/2021 | Kozachenok | G01S 15/96 |
| 2021/0374907 | A1* | 12/2021 | Su | G06T 3/4053 |
| 2021/0374913 | A1* | 12/2021 | Su | G06T 5/002 |

FOREIGN PATENT DOCUMENTS

CN  110956222 A  *  4/2020  ......... G06K 9/6256

OTHER PUBLICATIONS

K. Mahantesh and S. Rao A., "Content Based Image Retrieval - Inspired by Computer Vision & Deep Learning Techniques," 2019 4th International Conference on Electrical, Electronics, Communication, Computer Technologies and Optimization Techniques (ICEEC-COT), 2019, pp. 371-377, doi: 10.1109/ICEECCOT46775.2019.9114610.*

C. Hillar and S. Marzen, "Revisiting Perceptual Distortion for Natural Images: Mean Discrete Structural Similarity Index," 2017 Data Compression Conference (DCC), 2017, pp. 241-249, doi: 10.1109/DCC.2017.84.*

* cited by examiner

*Primary Examiner* — Jiangeng Sun

(57) ABSTRACT

Embodiments of a marine survey image enhancement system (MSIES) using temporal images from underwater camera are disclosed. In some embodiments, a MSIES system includes: a pre-processing module used to sub-sample input image into smaller image chunks; a DNN module constructed with many complex layers of neurons connected together and is designed to consume low quality, noisy image and produce high resolution realistic image; a post-processing module that merges all the output images from the DNN module with the original input image, forming a clearer, more detailed and higher signal to noise ratio marine survey image.

23 Claims, 3 Drawing Sheets

MARINE SURVEY IMAGE ENHANCEMENT SYSTEM

TECHNICAL FIELD

The present disclosure relates to the field of image processing, machine learning, artificial intelligence, deep learning, and more specifically to systems and techniques for training and inferencing with deep neural network (DNN) to provide a crisper and detailed image in marine surveying.

BACKGROUND

Canada occupies 16.2% of the world's 1.6 million kilometers coastline, which has the longest coastline in the world and twice as much as the United States in the 2nd place according to the world resources institute. Along the 265 thousands kilometers coastline, there are enormous natural resources waiting for the exploration and protection.

Among the existing underwater map from the Geographic Information System (GIS) is not precise enough to tell what exactly lies down the sea bed along the coastline, creating difficulty in protecting the environments and sustaining developments in the coastline area.

Deep neural network (DNN) is becoming popular in image processing recently as it performs well in object classification, object detection and image quality improvement with the advancements in GPU and TPU. A general DNN framework includes a layer for receiving inputs, multiple hidden layers containing millions of neurons connected together representing millions of logic when the inputs flow through the neurons, and finally flowing into an output layer presenting the result.

The traditional marine survey method relies on camera onboard the underwater remotely operated vehicle (ROV) to capture image footage, and the imaging quality degrades significantly with the particulates/bubbles in the water, lighting and equipment field of view, therefore it's almost impossible to log what's going on down there during the survey and draw a complete and detailed underwater map in the post processing step. Typical image signal processing system of this type are shown, for example, in the following patents:

U.S. PATENTS

U.S. Pat. No. 10,230,925 Maciejewski
U.S. Pat. No. 9,417,323 Carande
U.S. Pat. No. 9,176,227 Bergeron

CANADA PATENTS

CA 2986863 Wang
CA 2921672 Ravindran
CA 2987325 Zhu

Though such systems have demonstrated some image signal processing capability in different areas, there is need for a custom system designed for enhancing the image quality in the marine surveying field.

SUMMARY

Embodiments described herein provide a marine survey image quality enhancement (MSIE) system based on the popular deep neural network (DNN). The disclosed system greatly benefits from pre-processing, DNN module and post-processing stage working together to improve the quality of the marine survey image under various working conditions, creating possibilities for the a more detailed mapping of the underwater environments. For example, the disclosed MSIE system removes snow pattern in the image created by the plankton and other particulates in the water which creates a crystal clear representation of the surveying area.

The disclosed MSIE system contains three processing stages and training of a deep neural networks to greatly improve quality of marine survey image. In the optional pre-processing stage, a disclosed module is used to sub-sample input image into smaller image chunks, these chunks can be generated automatically or manually specified by the operator. Therefore in the next stage, each of the image chunks can be fed parallelly into the DNN module where they can be processed quickly and effectively. The DNN module contains multiple neural networks constructed with many complex layers of neurons connected together and is designed to consume low quality, noisy image and produce clear and more detailed image. In the post-processing stage, a module merges all the output images from the DNN module with the original input image, forming a clearer, more detailed and higher signal to noise ratio image.

DESCRIPTION

The terms "comprising", "including", "containing" and any variations thereof in the description, claims and the above-described drawings of the present disclosure are intended to cover process, methods, systems or products, which are not necessarily limited to these disclosed below.

Figure 1:
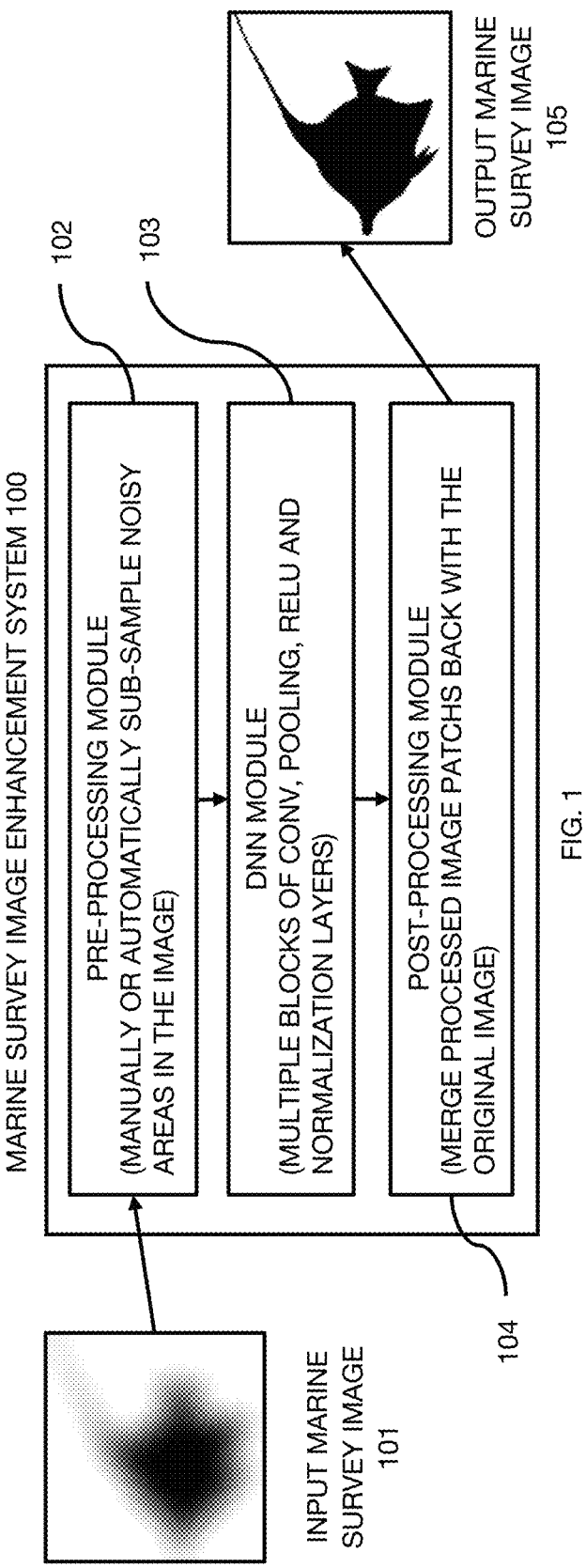
FIG. 1 shows a block diagram of a system design for enhancing marine image quality.

As seen in the representative drawing FIG. 1, the structure of the MSIE system 100 comprising three modules:
a pre-processing module 102;
a DNN module 103;
a post-processing module 104.

In some embodiments, the input marine survey images 101 as shown in FIG. 1 can be obtained from a onboard camera in a remote operated vehicle (ROV) or by cameras carried by a diver. Generally there are two ways of feeding the images to the MSIE system: the images can be streamed directly to a processing device capable of running the disclosed MSIE system 100 while the marine survey is in progress, we call this online processing; or directly save the images or videos onto a storage device like a hard drive or SD card, and then upload the images or videos to a device capable of running disclosed MSIE system 100 after the marine survey and this is called offline processing.

In order to process marine survey images 101 through the disclosed MSIE system 100 as seen in FIG. 1, a input marine survey image 101 maybe applied to the pre-processing module 102 first, the operator can choose between manually or automatically sub-sample one or more noisy areas in the image; then passing the output signals of the pre-processing module 102 to DNN module 103, wherein the signals will flow through multiple blocks of different neural network layers; the output of the DNN module 103 is then processed by post-processing module 104, wherein all the output images are merged back with the original image to create a more detailed marine survey image 105.

Figure 2:
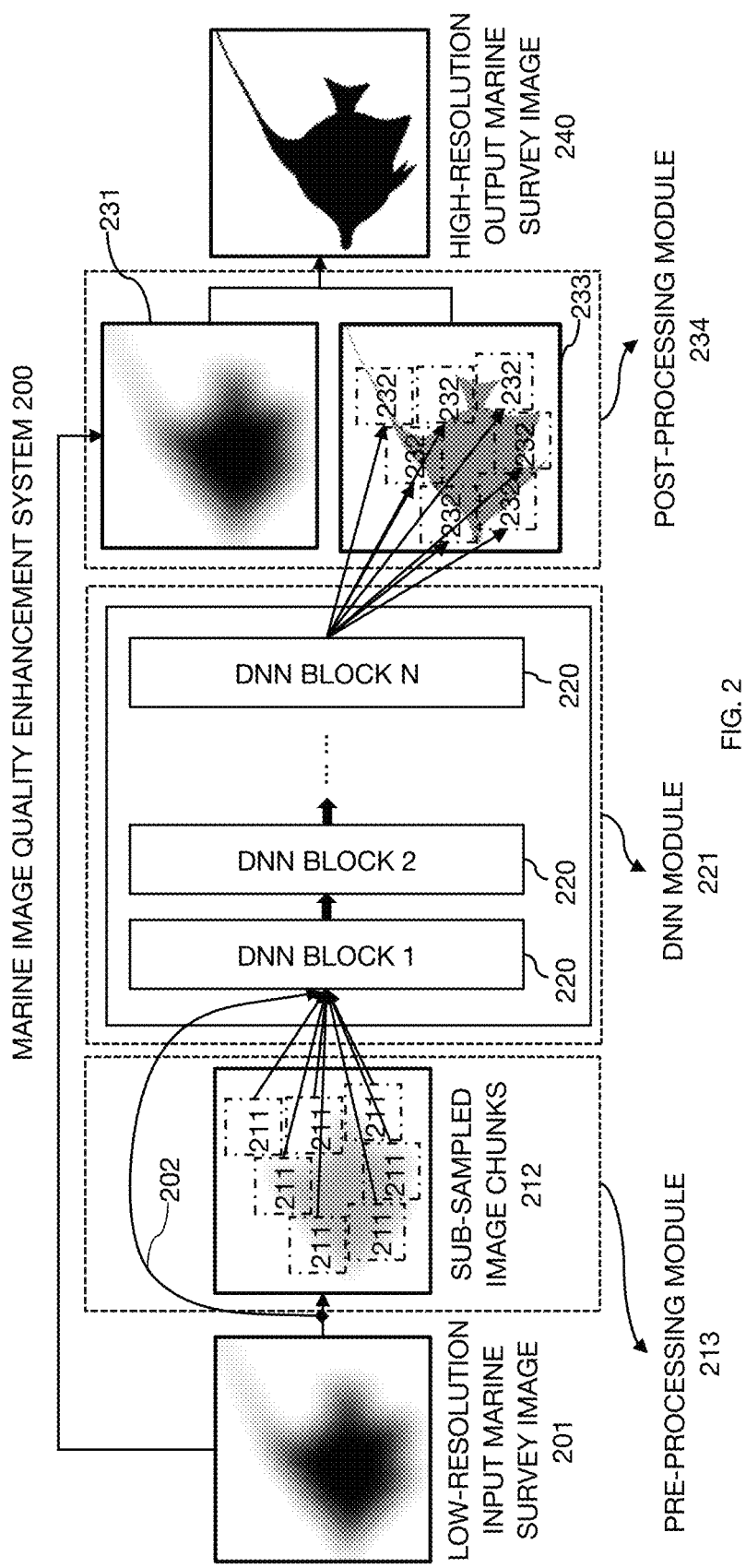
FIG. 2 shows a detailed implementation of a three module based DNN system with some embodiments described herein.

In some embodiments, the operator can decide whether to include first stage processing or not, as shown in FIG. 2, which means the input image 201 can be fed into the DNN module as a whole 202. Although this might slow down the processing speed of the DNN module 221 but this works well when the random particulates in the water covers all the field of view in the camera.

In some embodiments, the pre-processing module 213 can perform a sub-sample operation on specific areas in the input image either manually indicated by the operator or automatically by the algorithm. For example, regions 211 surrounded by the dash box can be selected by operator using a mouse; a edge detection algorithm can also be applied onto the input image and dash boxes can follow the edge detected and extracting the contour of the objects in the image.

Figure 3:
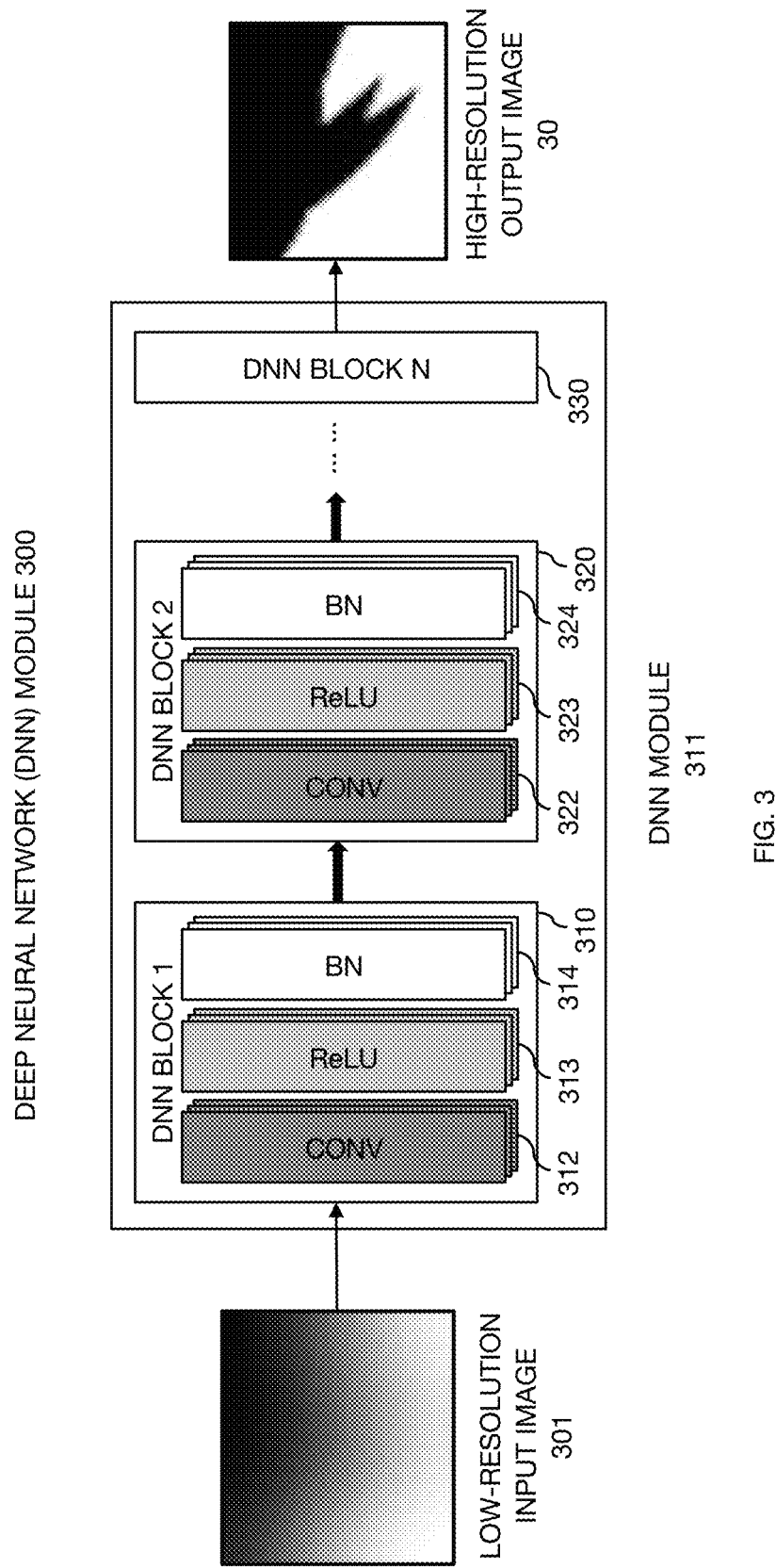
FIG. 3 shows a detailed implementation of a DNN system for producing a super-resolution image in accordance with some embodiments described herein.

In some embodiments, the deep neural network (DNN) module may contains one or more structurally identical blocks of neural network layers. In the embodiment of present disclosure as shown in FIG. 3, wherein a DNN block 310 includes a set of convolution (CONV) layers 312, a set of ReLU layers 313, and a set of Batch Normalization (BN) layers 314 connected sequentially, and a DNN block 320 includes exactly the same sets of layers as block 310 that are also connected sequentially. Specifically, CONV layers 312 and CONV layers 322 are structurally identical but have different neuron weight representation; ReLU layers 313 and ReLU layers 323 are structurally identical but have different neuron weight representation; BN layers 314 and BN layers 324 are structurally identical but have different internal weight representation. Similarly, all the following DNN block 3, 4 . . . N 330 share the same structure as the first DNN block and generally have different internal weight representation.

In some embodiments, the deep neural network (DNN) module may contain one or more structurally diverse blocks of neural network layers. In the embodiment of present disclosure as shown in FIG. 3, wherein a DNN block 310 includes a set of convolution (CONV) layers 222, a set of ReLU layers 223, and a set of Batch Normalization (BN) layers 224 connected sequentially. Wherein a DNN block 320 includes different sets of layers connected sequentially compare to DNN block 310. Specifically, CONV layers 312 and CONV layers 322 are structurally different, they might have different number of layers and/or different layers in size, and they have different neuron weight representation; ReLU layers 313 and ReLU layers 323 are structurally different, they might have different number of layers and/or different layers in size, and they have different neuron weight representation; BN layers 314 and BN layers 324 are structurally different, they might have different number of layers and/or different layers in size, and they have different neuron weight representation. Similarly, all the following DNN block 3, 4 . . . N 330 share the different structure with any other DNN blocks and have different internal weight representation.

In some embodiments, processing the input images 201 or sub-sampled image chunks 212 through the DNN module 221 involves applying the image sequentially through multiple neural network blocks 220 connected in series contains CONV layers 222, ReLU layers 223 and BN layers 224. Wherein the final output of the last block is then piped to a post-processing module 234 with additional neural network layers.

In some embodiments, the post-processing module obtained in step 234 described above may be operated by merging the original low-resolution input marine survey image 231 with the newly generated output image 233 from the DNN module 221. Specifically, by feeding DNN module 221 with sub-sampled image chunks 211, we get the output image chunks 232, then applying these output image chunks 232 to the original location in the input image. Therefore, a more detailed high-resolution output marine survey image 240 can be obtained.

In some embodiments, as shown in FIG. 3, demonstrated a image enhancement process through the DNN module 311. A low-resolution input image 301 is consumed by the DNN module 311, the image signal is then passed down to first DNN block 310 containing multiple different types of neural network layers, and then passed down to second DNN block 320, third DNN block . . . until the last DNN block N 330. The output of the last DNN block represents a high-resolution image 340 that shares the same dimension as the input image 301 but it contains far more details about the surveying object.

In some embodiments, the training of the DNN module 221 is performed on distributed GPU clusters.

In some embodiments, the generation of the dictionary is performed on distributed data centers.

In some embodiments, the inference of the DNN module 221 is performed on distributed GPU clusters in real time.

In some embodiments, the inference of the DNN module 221 is performed on distributed GPU clusters in batch which will be scheduled whenever the resource are available.

In some embodiments, the inference of the DNN module 221 is performed on on-board computer that runs on the ROV in real time.

In some embodiments, the image dictionary module is constructed with matching and aligning the close up survey image with remote image, processing both images through a DNN system generating features, and generate a unique key with the features through the hashing function, and wherein the features are matched with existing remote image features in the dictionary using cosine similarity measurement, therefore generating a matching pair of the remote coarse sub-image and close up detail image.

In some embodiments, the training of the DNN module relies on building a image dictionary contains the sub-sampled remote and close up images pair representing different views of the same marine survey area. Then human labeler comes in, some of the clear and detailed close up images are labeled as the positive example and some of the sub-sampled blurry remote images are labeled as negative example. After training many iterations with these labeled data, the deep neural network model is optimized for generating a crystal clear marine survey image from a noisy marine survey image.

What is claimed is:

1. A marine survey image enhancement system (MSIES), comprising:
   one or multiple processors;
   a module coupled with the one or multiple processors to receive marine survey image;
   a pre-processing module coupled with the one or multiple processors to sub-sample the marine survey image automatically or manually by operator;
   a DNN module coupled with the one or multiple processors to process low-resolution marine survey images and construct high-resolution, super-resolved images, wherein each of the sub-sample is fed parallelly into the DNN module, wherein the DNN module includes a plurality of DNN blocks connected in series, and wherein each DNN block of the plurality of DNN blocks includes a set of convolution layers, a set of ReLU layers, and a set of Batch Normalization layers connected sequentially; and a post-processing module coupled with the one or multiple processors to combine and fuse output images with the original input image to produce a higher signal to noise ratio marine survey image.

2. The MSIES of claim 1, wherein the marine survey images generally contain lots of noise due to the nature of particulates/bubbles in the water, lighting and equipment field of view; and Wherein a close-up marine survey image corresponds to a higher resolution representation of a survey field, and reveals detailed information about the area.

3. The MSIES of claim 1, wherein the set of sub-images from the pre-processing module receiving marine survey image can be fed into a multi-scale dictionary to improve indexing efficiency, wherein the pre-processing module is configured to index the input image by:

forward feeding the RGB channel image data alongside with location data into a feature extraction system, wherein the output includes the unique features on each tiles that can be used to construct a corresponding sub-image to match close up survey image, and wherein the output features is feed into a SHA256 hashing function to produce a unique and condense signature forming a key for the dictionary.

4. The MSIES of claim 2, wherein the training of the DNN system, the close up survey image is matched and aligned with remote sub-images using the features from the dictionary with cosine similarity measurement, wherein generating a matching pair of the remote coarse sub-image and close up detail image, wherein the human labeler comes in and labels all the images as positive or negative examples.

5. The MSIES system of claim 1, wherein the deep learning network (DNN) aims to construct a high-resolution, super-resolved image I(SR) from a low-resolution image I(LR) comprised a CNN module with several convolution layers, ReLU layers and Batch Normalization layers coupled in block and connected in series, wherein processing of each I(LR) through CNN module includes applying image through blocks of neural network layers generating I(SR).

6. The MSIES system of claim 1, wherein the DNN were trained to distinguish super-resolved image I(SR) from true high-resolution image I(Thr) which produces a loss measurements I(SR Gen) between the I(SR) and I(Thr); and wherein the process the training DNN we use I(SR Gen) to score a generated high-resolution, super-resolved close to reality image I(SR) thus encouraging the DNN to generate realistic detailed image.

7. A method for perform marine survey image processing using a deep neural network (DNN), the method comprising:

receiving a marine survey input image;

a optional pre-processing step that sub-samples input image into smaller parts, wherein the sub-sampling includes:

automatically sub-sampling of the noisy area in the input image; and manually sub-sample an area in the input image, parallel processing subset of the sub-sampled images using DNN module implemented through software and hardware, wherein the DNN module includes a plurality of DNN blocks connected in series, and wherein each DNN block of the plurality of DNN blocks includes a set of convolution layers, a set of ReLU layers, and a set of Batch Normalization layers connected sequentially;

combining the outputs from the processed image and original image into a high-resolution image producing a more detailed view of the original input image.

8. The method of claim 7, wherein the sub-sampled input image is generally much smaller than the input image to speed up processing time in the DNN module.

9. The method of claim 7, wherein the sub-sampling step is optional as the user can feed in the input image as a whole and get a clearer and more detailed image.

10. The method of claim 7, wherein the automatic sub-sampling step of the input image includes:

a filter module to capture the edge features of the objects in the image;

a generator module that generates smaller image chunks along the object edges in the image.

11. The method of claim 7, wherein the output image of the DNN module is generally higher resolution than the input image thus creating a more detailed view of the input image.

12. A deep neural network (DNN) system, comprising:

a pre-processing module sub-samples the marine survey image automatically or manually by a operator;

a DNN module that processes low-resolution marine survey images and constructs high-resolution, super-resolved images, wherein the DNN module includes a plurality of DNN blocks connected in series, and wherein each DNN block of the plurality of DNN blocks includes a set of convolution layers, a set of ReLU layers, and a set of Batch Normalization layers connected sequentially;

a training process of the DNN includes:

a group of human labeler comes in, some of the clear and detailed close up images are labeled as the positive example and some of the sub-sampled blurry remote images are labeled as negative example;

a system running DNN and feed the labeled data through the DNN, producing a loss measurements I(SR Gen), after many iterations, the DNN is optimized for distinguish between a clear marine survey image and a noisy marine survey image, an inference process comprising feeding in the low-resolution input image and outputting high-resolution more detailed image;

a post-processing module combines and fuses output images with the original input image to produce a higher signal to noise ratio marine survey image.

13. The system of claim 12, wherein the marine survey images can be red-green-blue images, black and white images or greyscale images.

14. The system of claim 12, wherein the pre-processing module is optional, which means the whole input image can be pass onto the DNN module for processing.

15. The system of claim 12, wherein the training process of DNN module can ingest the images in batch fashion, generally one or more image can be processed parallelly to improve efficiency.

16. The system of claim 12, wherein the training of the DNN module further comprising generated high or low resolution images with different signal processing algorithms.

17. The system of claim 12, wherein inference process of the DNN module can ingest the images in batch fashion, generally one or more image can be processed parallelly to improve efficiency.

18. The system of claim 12, wherein post-processing module a averaging filter can be used to smoothly patch image chunks with the original input image.

19. The system of claim 12, wherein post-processing module a complete replacement with the output image from the DNN can be used.

20. The system of claim 12, where the inference of the DNN are implemented in the software.

21. A system capable of performing neural network training and inference tasks on images, the system comprising:
one or multiple processors;
one or multiple memories holding the input images to be feed into the processor;
one or multiple memories holding output images generated by the processor;
a deep neural network (DNN) module running on the memory and the processor, wherein the DNN module includes a plurality of DNN blocks connected in series, and wherein each DNN block of the plurality of DNN blocks includes a set of convolution layers, a set of ReLU layers, and a set of Batch Normalization layers connected sequentially, and
wherein the DNN module includes:
a training process of the DNN includes:
a group of human labeler comes in, some of the clear and detailed close up images are labeled as the positive example and some of the sub-sampled blurry remote images are labeled as negative example;
a system running DNN and feed the labeled data through the DNN, producing a loss measurements I(SR Gen), after many iterations, the DNN is optimized for distinguish between a clear marine survey image and a noisy marine survey image,
an inference process comprising feeding in the low-resolution input image and outputting high-resolution more detailed image;
a post-processing module combines and fuses output images with the original input image to produce a higher signal to noise ratio marine survey image.

22. The system of claim 21, wherein the neural network training system can be implemented on an embedded system or server system.

23. The system of claim 21, wherein the neural network inference system can be implemented on an embedded system or server system.

* * * * *